US008033901B2

(12) United States Patent
Wood

(10) Patent No.: US 8,033,901 B2
(45) Date of Patent: Oct. 11, 2011

(54) ELECTRONIC GAME SYSTEM WITH CHARACTER UNITS

(75) Inventor: Ethan Wood, Plano, TX (US)

(73) Assignee: Mattel, Inc., El Segundo, CA (US)

(*) Notice: Subject to any disclaimer, the term of this patent is extended or adjusted under 35 U.S.C. 154(b) by 353 days.

(21) Appl. No.: 11/539,833

(22) Filed: Oct. 9, 2006

(65) Prior Publication Data

US 2008/0085773 A1    Apr. 10, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/1; 463/30; 463/42; 463/48; 206/776; 446/300; 446/175

(58) Field of Classification Search ........... 463/1, 40–42
See application file for complete search history.

(56) References Cited

U.S. PATENT DOCUMENTS

| | | | | |
|---|---|---|---|---|
| 4,846,693 | A | * | 7/1989 | Baer .............................. 434/308 |
| 5,636,994 | A | * | 6/1997 | Tong .............................. 434/308 |
| 5,746,602 | A | | 5/1998 | Kikinis |
| 5,758,777 | A | * | 6/1998 | Dods .............................. 206/776 |
| 5,766,077 | A | * | 6/1998 | Hongo ............................ 463/30 |
| 5,853,327 | A | | 12/1998 | Gilboa |
| 6,075,195 | A | * | 6/2000 | Gabai et al. ..................... 84/645 |
| 6,290,565 | B1 | | 9/2001 | Galyean, III |
| 6,292,272 | B1 | | 9/2001 | Okauchi et al. |
| 6,319,010 | B1 | | 11/2001 | Kikinis |
| 6,372,974 | B1 | | 4/2002 | Gross et al. |
| 6,423,892 | B1 | | 7/2002 | Ramaswamy |
| 6,443,796 | B1 | | 9/2002 | Shackelford |
| 6,460,851 | B1 | | 10/2002 | Lee et al. |
| 6,525,767 | B2 | | 2/2003 | Saito et al. |
| 6,572,431 | B1 | * | 6/2003 | Maa ............................. 446/301 |
| 6,612,501 | B1 | | 9/2003 | Woll et al. |
| 6,631,098 | B2 | | 10/2003 | Chang et al. |

(Continued)

FOREIGN PATENT DOCUMENTS

JP          2003216586         7/2003

(Continued)

OTHER PUBLICATIONS

"Remember the Godzilla FireWire Hub? US Company Brings Hubzilla to Market"; The MAC Observer; Sep. 20, 2002; http://www.macobserver.com/article/2002/09/20.1.

(Continued)

*Primary Examiner* — Paul A. D'Agostino
(74) *Attorney, Agent, or Firm* — Kolisch Hartwell, PC

(57) ABSTRACT

An electronic game system is provided. The system may include a base station operable to communicate with an electronic system and one or more character units operable to communicate with the base station. The one or more character units store data associated with one or more characters. The data are utilized to play a game using the electronic system. The character units may have substantially similar appearances to characters in the game. The base station also may have a character appearance. The character units may be removably attachable to the base station, alone or simultaneously, at an exterior or interior portion of a body part of the character appearance such as a head, a limb and a torso.

28 Claims, 10 Drawing Sheets

U.S. PATENT DOCUMENTS

| | | | |
|---|---|---|---|
| 6,650,870 B2 * | 11/2003 | White et al. | 455/41.1 |
| 6,702,644 B1 * | 3/2004 | Hornsby et al. | 446/330 |
| 6,729,934 B1 * | 5/2004 | Driscoll et al. | 446/297 |
| 6,763,226 B1 | 7/2004 | McZeal | |
| 6,773,325 B1 | 8/2004 | Mawle et al. | |
| 6,937,289 B1 * | 8/2005 | Ranta et al. | 348/460 |
| 6,957,287 B2 | 10/2005 | Lou et al. | |
| 6,979,210 B2 | 12/2005 | Regen et al. | |
| 6,996,636 B2 | 2/2006 | Hung et al. | |
| 7,037,166 B2 | 5/2006 | Shrock et al. | |
| 7,046,297 B2 | 5/2006 | Chou | |
| 7,081,033 B1 * | 7/2006 | Mawle et al. | 446/175 |
| 7,104,543 B2 * | 9/2006 | Wilk et al. | 273/288 |
| 7,113,220 B1 | 9/2006 | Misawa et al. | |
| 7,151,664 B2 | 12/2006 | Hosey | |
| 7,170,828 B2 | 1/2007 | Estevez | |
| 7,244,183 B1 * | 7/2007 | England | 463/48 |
| 7,618,303 B2 * | 11/2009 | Ganz | 446/175 |
| 2002/0000062 A1 * | 1/2002 | Smirnov | 44/397 |
| 2002/0052238 A1 | 5/2002 | Muroi | |
| 2002/0155893 A1 | 10/2002 | Swanberg et al. | |
| 2002/0183119 A1 | 12/2002 | Fessler | |
| 2003/0090588 A1 | 5/2003 | Wu | |
| 2003/0115264 A1 | 6/2003 | Takiyama | |
| 2004/0003150 A1 | 1/2004 | Deguchi | |
| 2004/0005928 A1 * | 1/2004 | Eguchi et al. | 463/43 |
| 2004/0043806 A1 | 3/2004 | Kirby et al. | |
| 2004/0130657 A1 | 7/2004 | Hsu | |
| 2004/0174452 A1 | 9/2004 | Kinemura et al. | |
| 2004/0214642 A1 | 10/2004 | Beck | |
| 2004/0218051 A1 | 11/2004 | Hsu | |
| 2005/0012850 A1 | 1/2005 | Wang | |
| 2005/0012853 A1 | 1/2005 | Wang | |
| 2005/0024526 A1 | 2/2005 | Wang | |
| 2005/0162545 A1 | 7/2005 | Jeon | |
| 2006/0100018 A1 * | 5/2006 | Ganz | 463/42 |
| 2006/0178217 A1 | 8/2006 | Jung et al. | |
| 2006/0197753 A1 | 9/2006 | Hotelling | |
| 2006/0246403 A1 | 11/2006 | Monpouet et al. | |
| 2006/0287110 A1 | 12/2006 | Klitsner et al. | |
| 2007/0067309 A1 | 3/2007 | Klein et al. | |

FOREIGN PATENT DOCUMENTS

| | | | |
|---|---|---|---|
| JP | 2005151784 | * | 11/2003 |
| WO | WO 0112285 A1 | | 2/2001 |
| WO | 0120540 | | 3/2001 |
| WO | WO 0247013 A2 | | 6/2002 |
| WO | WO 03043709 A1 | | 5/2003 |
| WO | WO 2004044755 A2 | | 5/2004 |

OTHER PUBLICATIONS

European Patent Office; European Search Report from related Application No. 07844024.5, dated Oct. 29, 2009.

"Stan Lee's Superhero Rings Pack a Solid Multimedia Punch", Kidscreen Magazine, Sep. 2005, by Lees, Nancy http://www.kidscreen.com/articles/magazine/20050901/power.html.

U.S. Patent and Trademark Office, International Search Report, May 9, 2008, 2 pages.

U.S. Patent and Trademark Office, Written Opinion of the International Searching Authority, May 9, 2008, 6 pages.

* cited by examiner

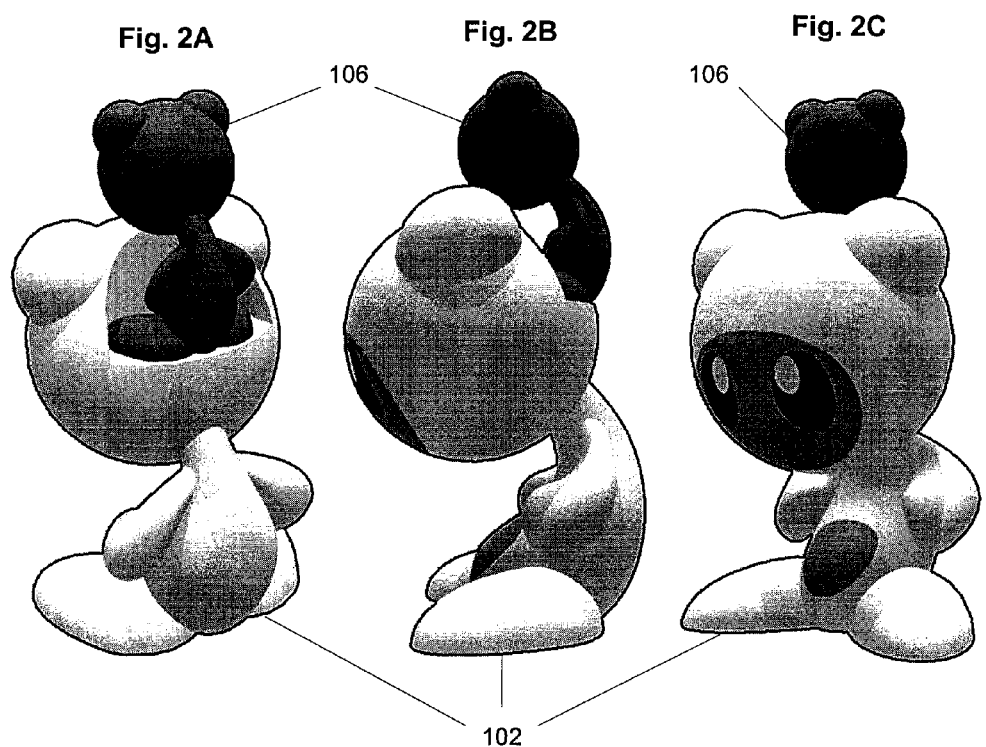

ELECTRONIC GAME SYSTEM WITH CHARACTER UNITS

BACKGROUND

Several types of electronic game systems exist. Games can be played on dedicated game consoles or on general purpose computers. Further, games can have one or more players and can be played using a single game system or a network of game systems, such as massively multiple player online role playing games. Games can be loaded onto an electronic system from a portable storage device such as a CD, or games can be downloaded from a computer network such as the Internet. However, different electronic game systems are desirable.

SUMMARY

In one embodiment, an electronic game system is provided. The system includes a base station operable to communicate with an electronic system and a first character unit operable to communicate with the base station. The first character unit stores first data associated with a first character. The system also includes a second character unit operable to communicate with the base station. The second character unit stores second data associated with a second character. The first data and second data are utilized to play a game using the electronic system.

In another embodiment, the first character unit has a substantially similar appearance to the first character in the game. In still another embodiment, the base station has a character appearance. In one embodiment, the first character unit is removably attachable to the base station. In another embodiment, the first character unit is removably attachable to the base station at an exterior or interior portion of a body part of the character appearance selected from the group consisting of a head, a limb and a torso. In still another embodiment, the base station is configured to enable the first character unit and the second character unit to be attached to the base station at the same time.

In one embodiment, the base station is configured to enable the first character unit and the second character unit to be attached to the base station at the same time and at the same body part of the character appearance. In another embodiment, the first character unit is removably attachable to a USB port of the base station. In still another embodiment, the game is an Internet based game. In another embodiment, the electronic system is a computer. In yet another embodiment, the base station is removably attachable to a USB port of the electronic system.

In one embodiment, a character unit is provided. The character unit includes a housing configured to resemble a character in a game and a communication device operable to communicate with an electronic system. The electronic system is used to play the game and the electronic system is in communication with a network. The character unit also includes a memory unit configured to store data associated with the character. The data is used to play the game, and the game includes a game world having an area associated with the character and viewable by a plurality of players of the game via the network.

In another embodiment, the communication device communicates with the electronic system through a base station. In still another embodiment, the character unit is removably attachable to a USB port of the base station. In another embodiment, the network is the Internet. In yet another embodiment, the character can accumulate virtual items by playing the game, and the virtual items can be displayed to the plurality of players in the area.

In one embodiment, a base station is provided. The base station includes a housing and a first communication device operable to communicate with an electronic system. The electronic system is used to play a game and is in communication with a network. The base station also includes a second communication device operable to communicate with a first character unit The first character unit is configured to resemble a first character in the game and to store first data associated with the first character. The first data is used to play the game. The base station also includes a third communication device operable to communicate with a second character unit. The second character unit is configured to resemble a second character in the game and to store second data associated with the second character. The second data is used to play the game.

In another embodiment, the first character unit is removably connectable to a USB port of the base station. In still another embodiment, the housing is shaped similarly to the first character unit. In yet another embodiment, the base station also includes a first USB port operable to connect to the first character unit. The first USB port is located at an exterior or interior portion of a body part of the housing selected from the group consisting of a head, a limb and a torso. In one embodiment, the base station also includes a second USB port operable to connect to the second character unit. The second USB port is located at a same body part as the first USB port.

Additional features and advantages are described herein, and will be apparent from, the following Detailed Description and the figures.

BRIEF DESCRIPTION OF THE FIGURES

FIG. 2A is a back perspective view of a base station with one character unit attached in accordance with one embodiment.

FIG. 2B is a side perspective view of a base station with one character unit attached in accordance with one embodiment.

FIG. 2C is a front perspective view of a base station with one character unit attached in accordance with one embodiment.

DETAILED DESCRIPTION

In one embodiment, a game system is provided. Preferably, the game system includes a computer; however, a computer is not required. The game system also preferably includes a base station in communication with the computer; however, a base station is not required. Preferably, the base station stores game information used by the computer to play a game; however, the base station is not required to store game information. Game information can additionally or alternatively be provided by a portable storage medium such as a CD; however, game information is not required to be provided by either a base station or a portable storage medium.

The game system also includes one or more character units. Preferably, character units include information associated with a character in a game. The information can include game information, character information and/or player information. Game information can include game code to be executed (e.g., offline or online) on the computer, access information useable by the computer to access a game or access portions of a game or to delineate access privileges, or any other suitable information associated with one or more games. Character information can include character appearance in one or more games, character attributes, items available to the character, score, points, level, game world areas or games accessible to the character, or any other suitable information associated with a character. Player information can include a player's name, user name, contact information, associated characters, game access privileges, awards, information about a virtual trophy area or other personal area within one or more games, or any other suitable information associated with a player.

Preferably, the appearance of a character in one or more games is substantially similar to the appearance of a character unit with which the character is associated; however, a character and a character unit can have any suitable appearance.

Additional Example Embodiments

Figure 1A:
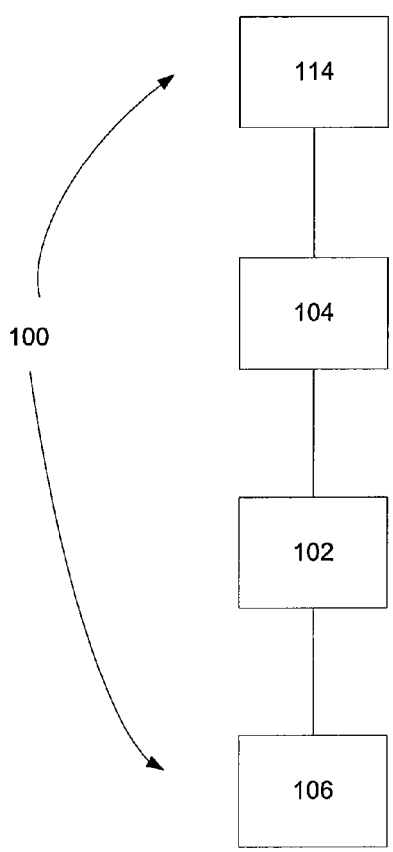
FIG. 1A is a block diagram of a game system having a single character unit coupled to a base station in accordance with one embodiment.
Figure 1B:
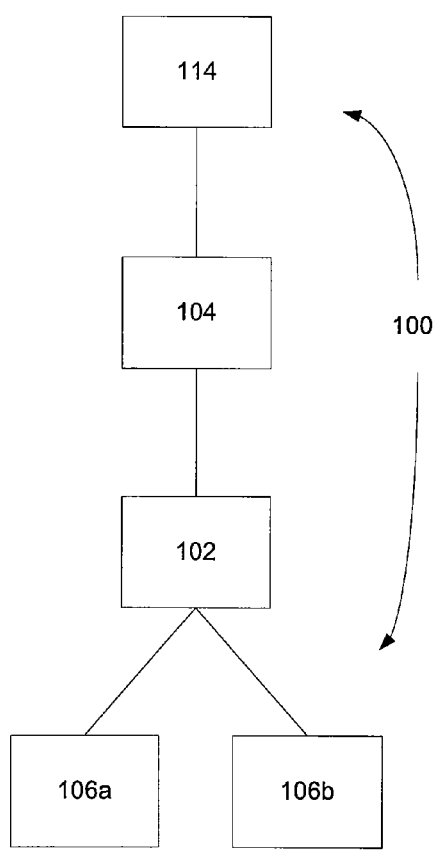
FIG. 1B is a block diagram of a game system having two character units coupled to a base station in accordance with one embodiment.
Figure 3:
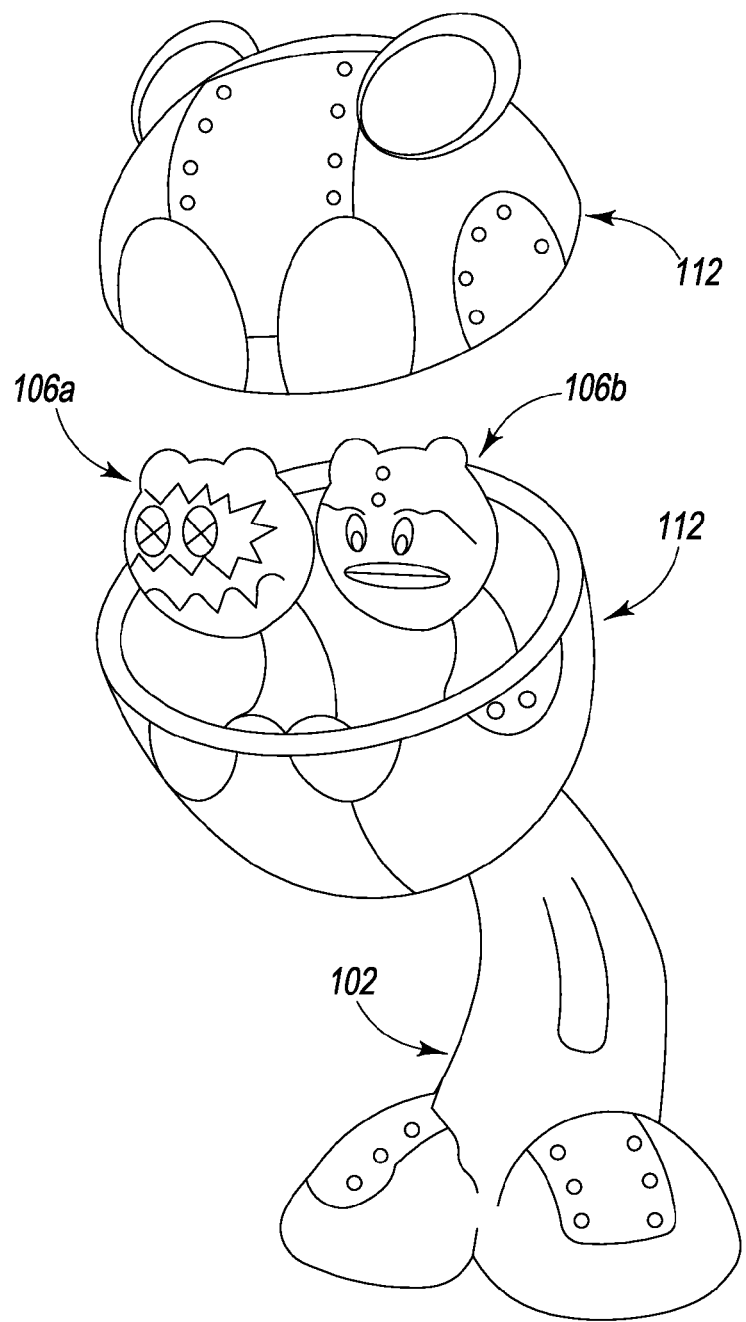
FIG. 3 is a diagram of a base station with two character units attached in accordance with one embodiment.
Figure 4:
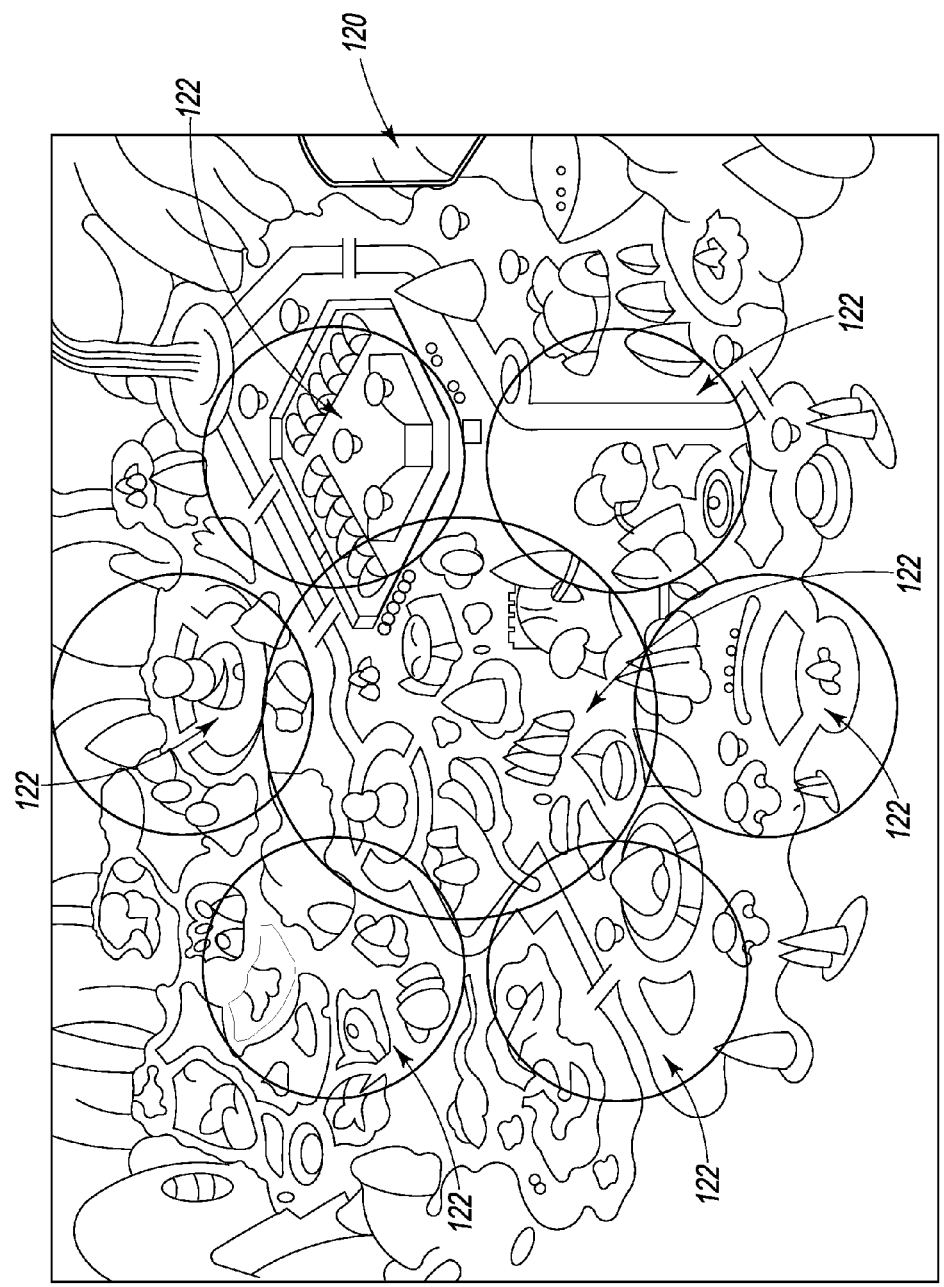
FIG. 4 is a diagram of a game world having a plurality of game areas in accordance with one embodiment.
Figure 5:
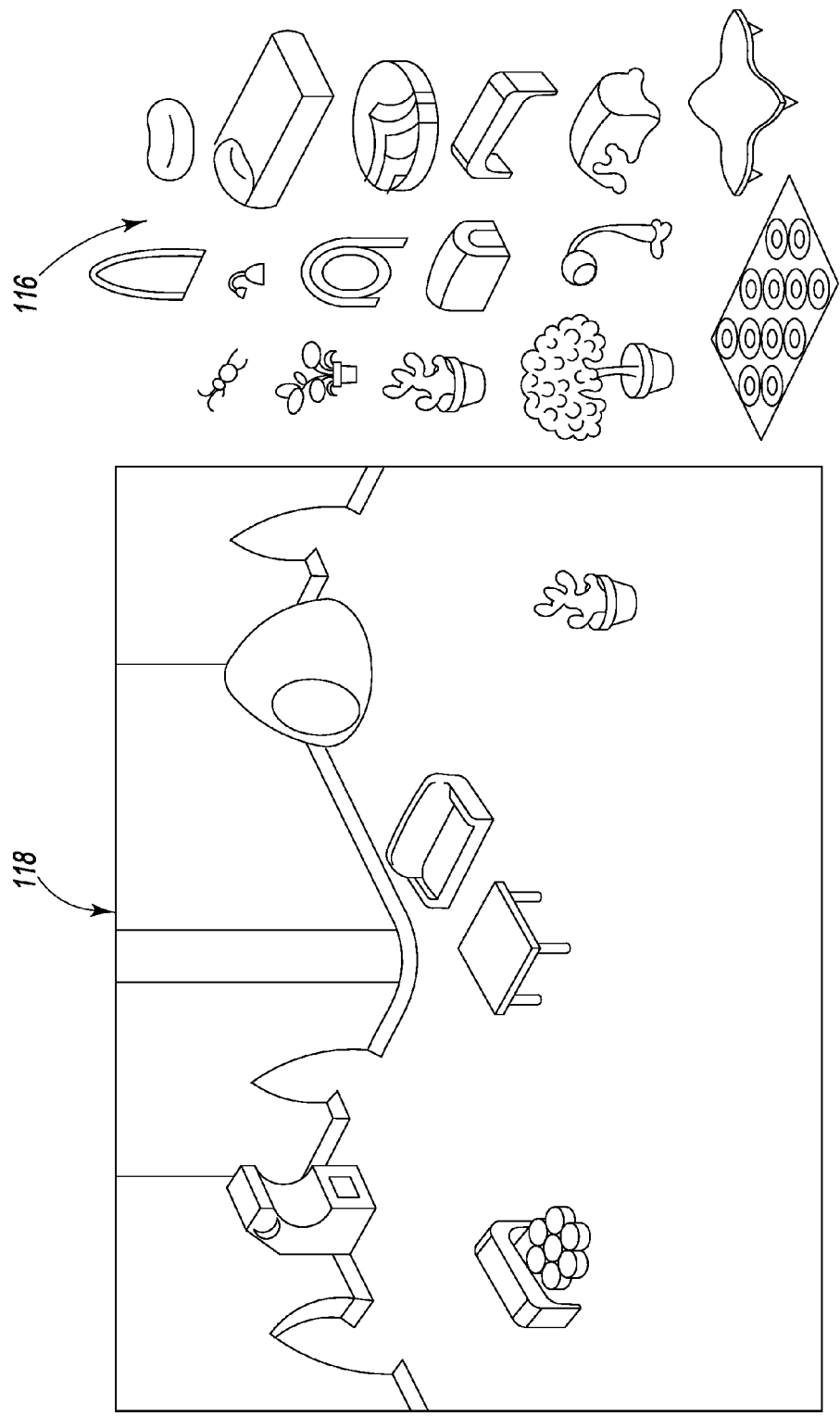
FIG. 5 is a diagram of a game area associated with a player in which a player can display one or more virtual items to other players in accordance with one embodiment.
Figure 6:
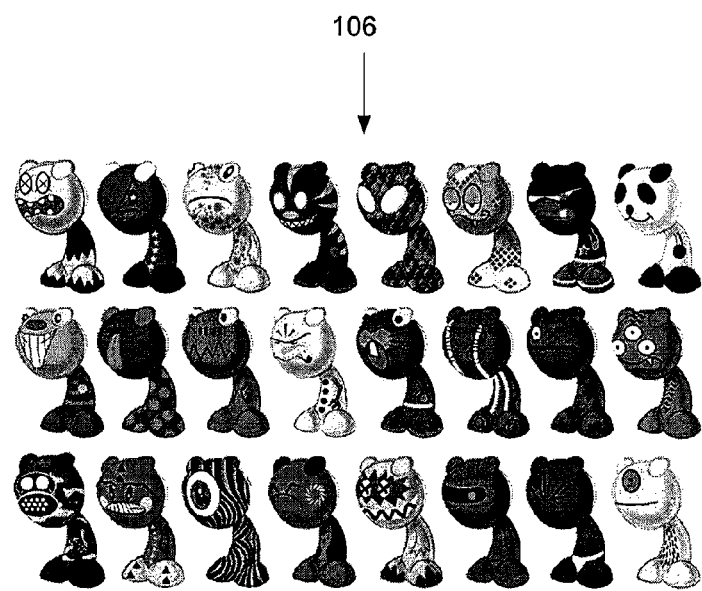
FIG. 6 is a diagram of a plurality of character units in accordance with one embodiment.
Figure 7:
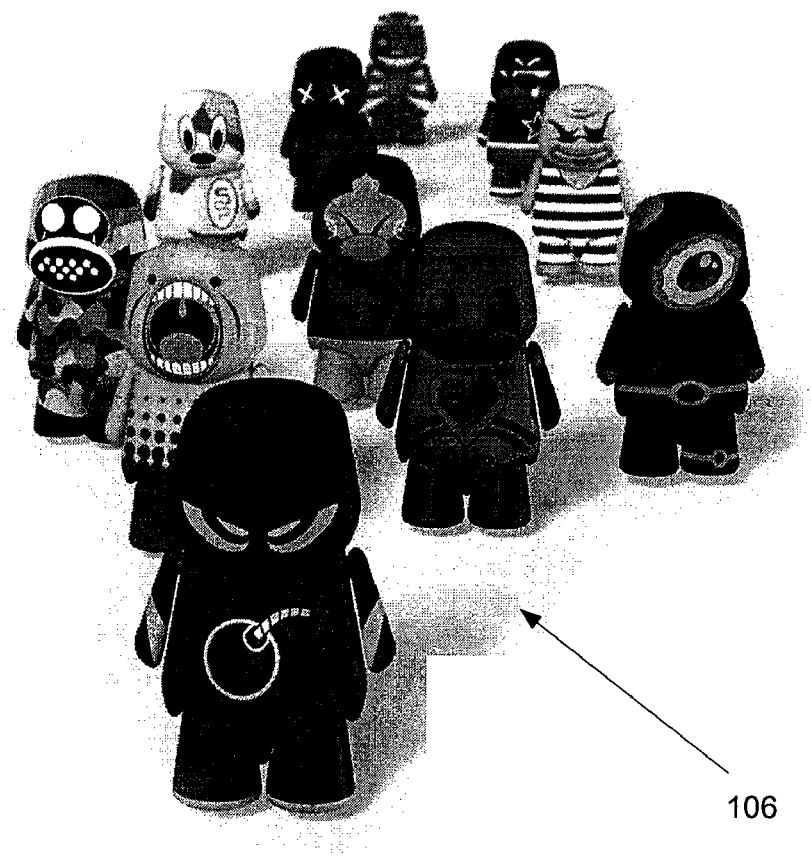
FIG. 7 is a diagram of a plurality of character units in accordance with another embodiment.
Figure 8:
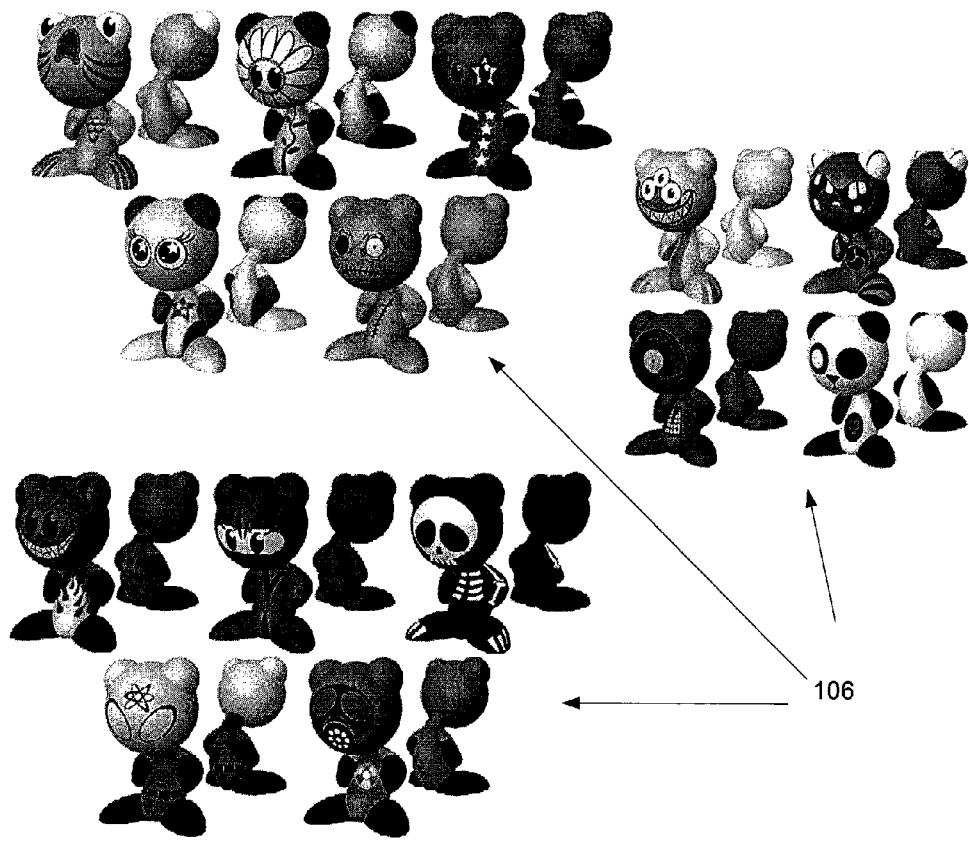
FIG. 8 is a diagram of a plurality of character units in accordance with yet another embodiment.
Figure 9:
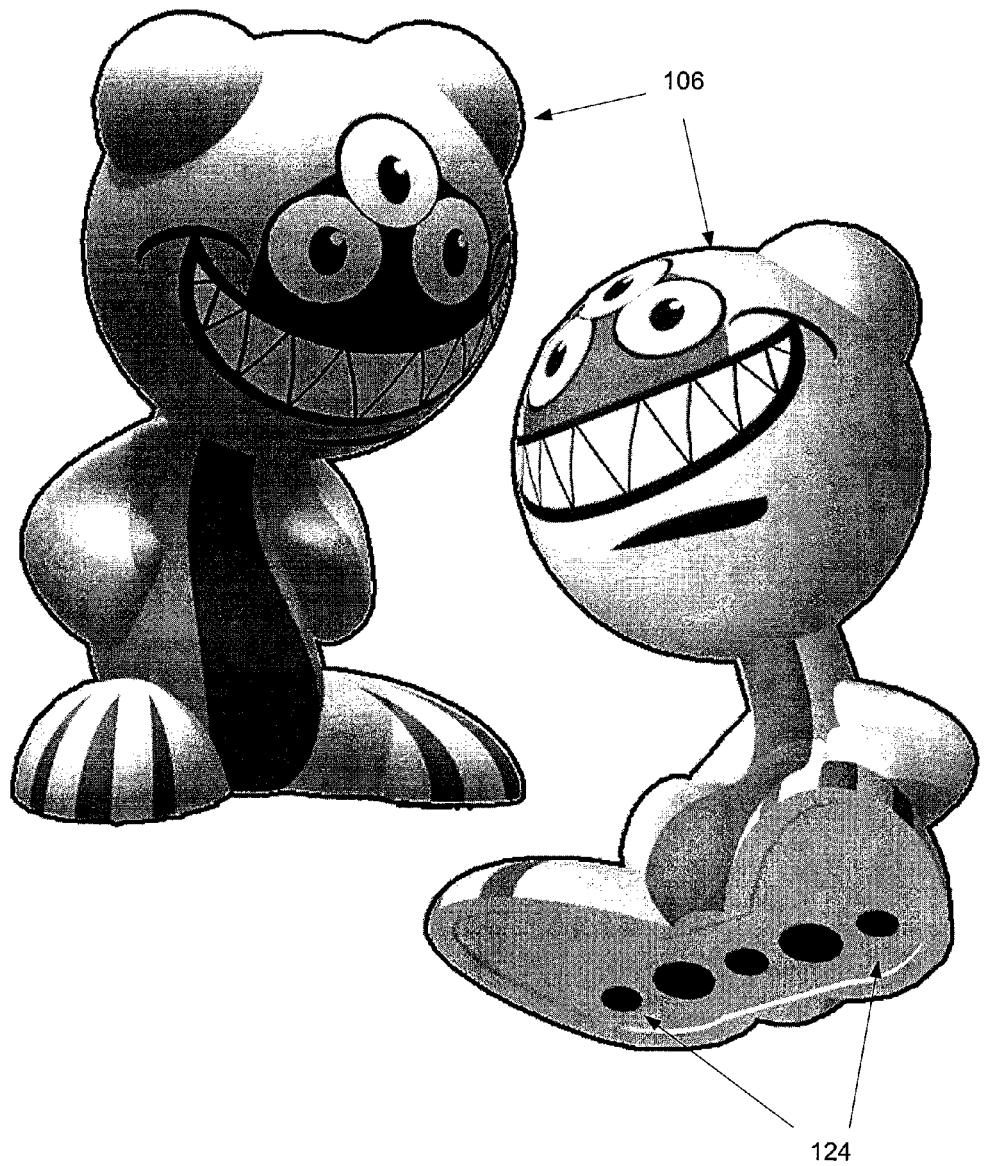
FIG. 9 is a diagram of a character unit from two perspectives showing a plurality of electronic connectors in accordance with one embodiment.
Figure 10:
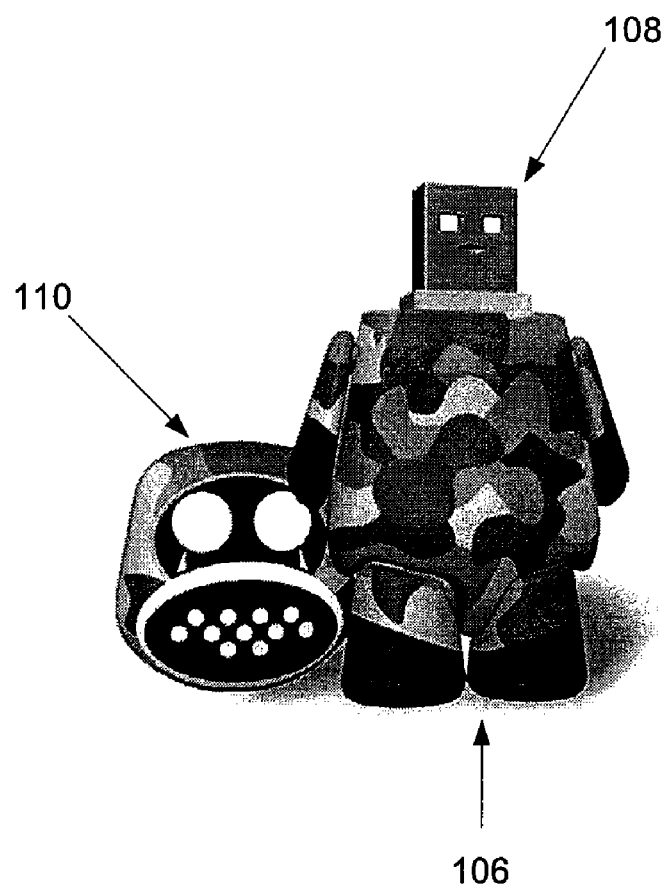
FIG. 10 is a diagram of a character unit with the head removed to expose a USB port in accordance with one embodiment.

FIGS. 1a-7 show an electronic game system in accordance with one or more embodiments. Preferably, the system 100 includes a base station 102 operable to communicate with an electronic system 104; however, a base station 102 is not required. The electronic system 104 is preferably a general purpose computer; however, the electronic system can be a game console. The electronic game system 100 also preferably includes a first character unit 106a (or 106) operable to communicate with the base station 102. The first character unit 106a stores data associated with a first character. In one embodiment, the system 100 also includes a second character unit 106b operable to communicate with the base station 102. The second character unit 106b stores data associated with a second character.

The data associated with the first and second characters is utilized to play a game using the electronic system 104. Preferably, the data includes one or more images of the character; however, the data is not required to include an image of the character. In one embodiment, a character unit stores four images or sprites of a character, a front, side, back and top view; however, in other embodiments, other numbers of images and other views are stored. Preferably, images of the character are stored as write-protected to prevent alteration; however, images of characters or copies of images of characters can be stored in a character unit as writeable or in any other suitable manner.

In various embodiments, character units 106 store a character identifier, a game (e.g., a flash based game, a logic game, a puzzle game, a maze game, an arcade-like game, a memory game, a turned game, a non-turned game, an Internet based or other online game, an offline game, a one-player game, a two-player game, a multi-player game, etc.) or information used to access or play a game, game information (e.g., scores; levels; awarded items; accessible game areas; number of game accesses, score uploads or prize redemptions available when such accesses, uploads or redemptions are limited or fixed; game privileges; etc.) or character information (e.g., character attributes, character abilities, character possessions, user identifier associated with the character, etc.); however a character unit 106 is not required to store any such information. Further, in various embodiments, a character unit 106 stores the information in any suitable storage device, including but not limited to digital memory chips or electronic component arrangements including one or more resistors. In one embodiment, a character unit 106 has a limited or fixed number of accesses to an online game or game site, and a user must purchase additional character units 106 or purchase additional access privileges for the character unit 106 to continue accessing the online game or game site after the limited or fixed number is reached; however, in other embodiments, the limited or fixed number of accesses is not required. Preferably, a character unit 106 can play an unlimited amount of offline games; however, a character unit 106 can be limited in the number of offline games it is able to play, similar to the number of accesses to an online game in the above embodiment, if desired.

Preferably, a user can register the character units 106 the user possesses; however, such registration is not a required feature in several embodiments. In one embodiment, rewards, game privileges and other game features or real world prizes available to a user are at least partly determined by the number of character units 106 registered to a user and/or which specific character units 106 or types of character units 106 are registered to the user. In another embodiment, having the same amount of points and/or credits associated with one character unit 106 registered to a user results in less desirable rewards, game privileges and other game features or real world prizes being available to a user than if the user has the same amount of points and/or credits associated with a plurality of character units 106 registered to the user.

Preferably, the first character unit 106a has a substantially similar appearance to the first character in the game; however, the first character unit 106a can have any suitable appearance. In one embodiment, character unit 106 has a USB connector 108 for connecting to a base station 102 and/or an electronic system 104; however, a character unit 106 can connect to a base station 102 and/or an electronic system 104 wirelessly (e.g., RFID, Blue Tooth, etc.) or using any other suitable connector such as one or more electronic contacts 124. Preferably, the USB connector 108 is concealed by a removable or movable head 110 of a character unit 106; however, the USB connector 108 can be located conspicuously or inconspicuously in any suitable location.

Preferably, when a character unit 106 is inserted into a base station 102 and/or an electronic system 104, a game associated with the character unit 106 is automatically started on the electronic system 104 or a character and/or additional game features or access associated with the character unit 106 are automatically provided to a game already started on the electronic system 104; however, any suitable operation, including no operation, can take place when a character unit 106 is inserted into a base station 102 and/or an electronic system 104.

Preferably, the base station 102 has a character appearance; however, the base station 102 is not required to have a character appearance. The character appearance of the base station 102 can be similar to the appearance of one or more character units, similar to another character in a game associated with or played using the base station 102, or any other suitable appearance. Preferably, the first character unit 106*a* is removably attachable to the base station 102; however, the first character unit 106*a* is not required to be removably attachable to the base station 102. Further, the first character unit 106*a* is preferably removably attachable to the base station 102 at an accessible location inside the head 112 of the base station 102; however, the first character unit 106*a* can be removably attachable to any suitable location on or within the base station 102, including but not limited to an exterior or interior portion of a body part of the character appearance such as the head, a limb, the torso or any other suitable location.

In one embodiment, the base station 102 is configured to only enable one character unit 106 to attach to the base station 102 at a time. However, in another embodiment, the base station 102 is configured to enable the first character unit 106*a* and the second character unit 106*b* to be attached to the base station at the same time. Further, the base station 102 can be configured to enable the first character unit 106*a* and the second character unit 106*b* to be attached to the base station 102 at the same time and at the same body part of the character appearance; however, such a configuration is not required. In one embodiment, the first character unit 106*a* attaches to a USB port of the base station 102; however, the first character unit 106*a* can connect wirelessly or through any other suitable wired connection or port such as one or more electronic connectors. Preferably, the base station 102 is removably attachable to a USB port of the electronic system 104, for example by a USB cable; however, the base station 102 can connect to the electronic system 104 wirelessly or using any suitable wired connection or port.

Character Unit Embodiments—Base Station Optional

In one embodiment, a character unit 106 is provided. The character unit 106 preferably includes a housing configured to resemble a character in a game and a communication device 108 operable to communicate with an electronic system 104; however, the character unit 106 can have any suitable appearance and is not required to have such a communication device 108. Preferably, the electronic system 104 is used to play the game (e.g., online or offline) and the electronic system 104 is in communication with a network 114. The character unit 106 also preferably includes a memory unit configured to store data associated with the character; however, the memory unit of a character unit can store any suitable data. The data is used to play the game, and the game preferably includes a game world 120 having an area 118 associated with the character and viewable by a plurality of players of the game via the network 114; however, the game is not required to include such a game world 120.

Preferably, the communication device 108 communicates with the electronic system 104 through a base station 102; however, the communication device can communicate with the electronic system 104 directly, if desired. In one embodiment, the character unit 106 is removably attachable to a USB port of the base station 102; however the character unit 106 can be attachable to any suitable portion of the base station 102, such as one or more electronic connectors, and the character unit 106 is not required to be removably attachable to a USB port of the base station 102.

Preferably, the network 114 is the Internet; however, the network 114 is not required to be the Internet and can be any suitable network. Preferably, a character or player associated with the character unit 106 can accumulate virtual items 116 by playing one or more games; however, such a game feature is not required. Further, the virtual items 116 or other indicators of the player or character's record of game play can be displayed to a plurality of other players in an area 118 of a game or game world 120. Virtual items 116 can be furniture, decorative items, weapons, cars, signs or any other suitable items.

Preferably, the game world 120 includes a plurality of areas 122; however the game world 120 is not required to have a plurality of areas. Further, access to the areas 122 is preferably restricted. A player preferably gains access to game areas 122 by attaching a character unit 106 with access privileges to the area 122 to the base station 102; however, a player can be granted access to a game area 122 in any suitable manner, including but not limited to earning access by accomplishing tasks in a game or accumulating a collection of virtual items 116 or points.

Base Station Embodiments—Character Units Optional

In one embodiment, a base station 102 is provided. The base station 102 preferably includes a housing and a first communication device operable to communicate with an electronic system 104. Preferably, electronic system 104 is used to play a game and is in communication with a network 114. Preferably, the base station 102 stores game data which enables a player to play the game using the electronic system 104; however, such game data can be stored on the electronic system 104, a portable storage medium or downloaded from the network 114. Alternatively, the base station 102 requires a character unit 106 to enable game play.

The base station 102 also includes a second communication device operable to communicate with a first character unit 106*a*. Similar to as described above, the first character unit 106*a* is preferably configured to resemble a first character in the game and to store first data associated with the first character. The first data is preferably used to play the game. In some embodiments, the base station 102 also includes a third communication device operable to communicate with a second character unit 106*b*. It should be noted that in other embodiments, a base station 102 can have any suitable number of communication devices for communicating with any suitable number of character units 106 and/or other base stations 102. Also similar to as described above, the second character unit 106*b* is preferably configured to resemble a second character in the game and to store second data associated with the second character. The second data is preferably used to play the game.

Preferably, the housing is shaped similarly to the first character unit; however, the housing can have any suitable shape. Preferably, the housing resembles one or more characters of a game playable using the base station 102; however, the housing can have any suitable appearance.

Preferably, the first character unit 106*a* is removably connectable to a first USB port of the base station 102; however, the first character unit 106*a* can be connected to the base station 102 in any suitable manner and the first character unit 106*a* is not required to be connected to the base station 102.

Preferably, the first USB port is located at an exterior or interior portion of a body part of the housing including but not limited to a head, a limb and a torso. In one embodiment, the base station 102 also includes a second USB port operable to connect to the second character unit 106b located at a same body part as the first USB port; however the first and second USB ports (or other suitable connectors such as one or more electronic connectors) can be located in any suitable location.

Exemplary Game Play

In one embodiment, game play is initiated by connecting a base station 102 or character unit 106 to an electronic system 104. Preferably, game play is initiated automatically; however, game play can be initiated in any suitable manner. Preferably, game play involves a virtual world 120 in which a player plays one or more games, explores one or more game areas 122 and decorates a room or "crib" associated with a player; however, game play can involve any suitable features and can involve online or offline features.

In one embodiment, a user can only attach one character unit 106 to a base station 102; however, in other embodiments, a user can attach two or more character units 106 to a base station 102 to access and/or play a game using the characters associated with the attached character units 106. For example, a player playing a maze game and encountering an obstacle can attach another character unit 106 associated with a character having the ability to circumvent or eliminate the obstacle. The player can then use the additional character to circumvent or eliminate the obstacle. Alternatively, additional characters added by attaching additional character units 106 can be opponents or allies in head-to-head or multi-player games. It should be noted that when two character units 106 are used to play a game, in various embodiments the character units 106 can be attached sequentially and/or simultaneously.

Preferably, a player is able to accumulate prizes, awards or items 116 by playing a game and is further able to display some or all of these prizes, awards or items 116 in a room 118 or other game world area associated with the player that is viewable to other players; however, the player is not required to have such an ability.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic game system comprising:
   an electronic system used to play a game in communication with a network, the game including a game world having an area associated with a first character in the game;
   a base station operable to communicate with the electronic system and having a character appearance;
   a first character unit operable to communicate with the base station, the first character unit storing first data associated with the first character, wherein the first character unit has a substantially similar appearance to the first character in the game;
   wherein the character appearance of the base station is similar to the appearance of the first character unit.

2. The electronic game system of claim 1, further comprising:
   a second character unit operable to communicate with the base station, the second character unit storing second data associated with a second character, wherein the first data and second data are utilized to play a game using the electronic system.

3. The electronic game system of claim 1, wherein the first character unit is removably attachable to a USB port of the base station.

4. The electronic game system of claim 1, wherein the game is an Internet based game.

5. The electronic game system of claim 1, wherein the first character unit is coupled to the base unit by one or more contacts.

6. The electronic game system of claim 1, wherein the electronic system is in communication with a network.

7. The electronic game system of claim 1, wherein the first character accumulates virtual items in the area associated with the first character by playing the game.

8. The electronic game system of claim 1, wherein the first character unit includes a communication device for communicating with the base station, the communication device being concealed by a removable head.

9. The electronic game system of claim 2, wherein the character appearance of the base unit includes a head.

10. The electronic game system of claim 9, wherein the first character unit is removably attachable to the base station.

11. The electronic game system of claim 10, wherein the first character unit is removably attachable to the base station at the head.

12. The electronic game system of claim 11, wherein the base station is configured to enable the first character unit and the second character unit to be attached to the base station at the same time.

13. The electronic game system of claim 12, wherein the base station is configured to enable the first character unit and the second character unit to be attached to the base station at the same time and at the head.

14. The electronic game system of claim 5, wherein the base station is removably attachable to a USB port of the electronic system.

15. A character unit comprising:
   a housing configured to resemble a character in a game;
   a communication device operable to communicate with an electronic system through a base station with a character appearance that resembles the character in the game, wherein the electronic system is used to play the game and wherein the electronic system is in communication with a network; and
   a memory unit configured to store data associated with the character, wherein the data are used to play the game, wherein the game includes a game world having an area associated with the character and viewable by a plurality of players of the game via the network.

16. The character unit of claim 15, wherein the character unit is removably attachable to a USB port of the base station.

17. The character unit of claim 15, wherein the network is the Internet.

18. The character unit of claim 15, wherein the character accumulates virtual items by playing the game and wherein the virtual items are displayed to the plurality of players in the area associated with the character.

19. The character unit of claim 15, wherein the communication device is concealed by a removable head.

20. The character unit of claim 18, wherein the virtual items include at least one of furniture and decorative items.

21. A base station comprising:
   a housing;
   a first communication device operable to communicate with an electronic system, wherein the electronic system is used to play a game and wherein the electronic system is in communication with a network; and a second communication device operable to communicate with a first character unit, the first character unit being configured to resemble a first character in the game and storing first data associated with the first character, wherein the first data are used to play the game and the game includes a game world having an area associated with the first character and viewable by a plurality of players of the game via the network;

wherein the housing is shaped similarly to the first character unit.

22. The base station of claim 21, wherein the first character unit is removably connectable to a USB port or one or more electronic contacts of the base station.

23. The base station of claim 21, wherein the base station further comprises:

a third communication device operable to communicate with a second character unit, the second character unit being configured to resemble a second character in the game and storing second data associated with the second character, wherein the second data are used to play the game.

24. The base station of claim 23, further comprising:

a first USB port or first set of one or more electronic contacts operable to connect to the first character unit, the first USB port or first set of one or more electronic contacts being located at an exterior or interior portion of a body part of the housing selected from the group consisting of a head, a limb and a torso; and a second USB port or second set of electronic contacts operable to connect to the second character unit, the second USB port or second set of electronic contacts being located at a same body part as the first USB port or first set of electronic contacts.

25. The electronic game system of claim 6, wherein the area associated with the first character is viewable by a plurality of players of the game via the network.

26. The electronic game system of claim 7, wherein the virtual items include at least one of furniture and decorative items.

27. An electronic game system comprising:

an electronic system used to play a game in communication with a network, the game including a game world having an area associated with a first character in the game;

a base station operable to communicate with the electronic system and having a character appearance that includes a removable head; and a first character unit operable to communicate with the base station, the first character unit storing first data associated with the first character, wherein the first data are used to play the game and the first character unit has a substantially similar appearance to the first character in the game and to the character appearance of the base station;

wherein the first character unit is removably attachable to the base station at a location concealable by the removable head of the base station.

28. The electronic game system of claim 27, further comprising:

a second character unit operable to communicate with the base station, the second character unit storing second data associated with a second character;

wherein the second data are used to play the game using the electronic system and wherein the second character unit is removably attachable to the base station at a second location concealable by the removable head of the base station.

* * * * *